United States Patent [19]

Yokoyama et al.

[11] Patent Number: 6,078,618
[45] Date of Patent: Jun. 20, 2000

[54] MOTION VECTOR ESTIMATION SYSTEM

[75] Inventors: Yutaka Yokoyama; Shu-Yu Zhu; Masayuki Mizuno, all of Tokyo, Japan

[73] Assignee: NEC Corporation, Japan

[21] Appl. No.: 09/034,583

[22] Filed: Mar. 4, 1998

[30] Foreign Application Priority Data

May 28, 1997 [JP] Japan ................................. 9-138598

[51] Int. Cl.⁷ ........................................... H04N 7/12
[52] U.S. Cl. .......................... 375/240; 348/699; 348/416
[58] Field of Search .................................. 348/699, 700, 348/416, 402, 407, 413; 382/107, 236, 238; 386/111; 375/240

[56] References Cited

U.S. PATENT DOCUMENTS

| | | | |
|---|---|---|---|
| 5,111,511 | 5/1992 | Ishii et al. ............................... | 382/107 |
| 5,157,732 | 10/1992 | Ishii et al. ............................... | 382/107 |
| 5,200,820 | 4/1993 | Gharavi .................................... | 348/416 |
| 5,805,239 | 9/1998 | Vos et al. ................................. | 348/699 |
| 5,844,630 | 12/1998 | Yamauchi ................................ | 348/699 |
| 5,870,500 | 2/1999 | Daoudi et al. ........................... | 382/236 |
| 5,940,130 | 8/1999 | Nilsson et al. .......................... | 348/416 |
| 5,973,755 | 10/1999 | Gabriel .................................... | 348/699 |
| 6,005,639 | 12/1999 | Thomas et al. ......................... | 348/699 |

FOREIGN PATENT DOCUMENTS

| | | | |
|---|---|---|---|
| 1-166684 | 6/1989 | Japan ............................... | H04N 7/12 |
| 5-328333 | 12/1993 | Japan ............................... | H04N 7/12 |

*Primary Examiner*—Vu Le
*Attorney, Agent, or Firm*—Ostrolenk, Faber, Gerb & Soffen, LLP

[57] ABSTRACT

A reference picture storing section 101 stores reference picture data referred in a motion vector estimation. A current picture storing section 102 stores a current picture data for the motion vector estimation. A motion vector estimating section 103 takes matching between the current picture data and the reference picture data to estimate a motion vector having the minimum difference. A motion vector statistics processing section 104 calculates an average value and a histogram from each picture of an estimated motion vector. A shift vector setting section 105 calculates a shift vector of a motion vector search window based on the average value and histogram in each of coded pictures. A search window designating section 106 designates a motion vector to be searched according to the calculated shift vector so as to cause the motion vector estimating section 103 to estimate the motion vector.

30 Claims, 8 Drawing Sheets

PRIOR ART
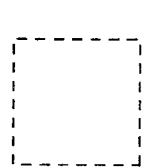
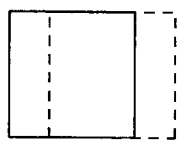
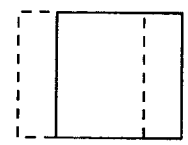
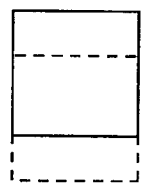
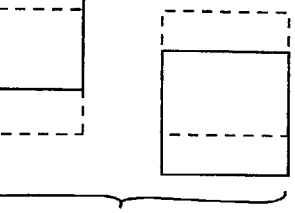
FIG15.A    FIG15.B    FIG15.C
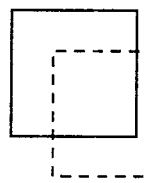
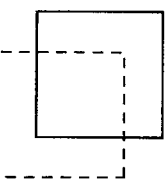
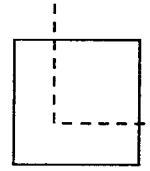
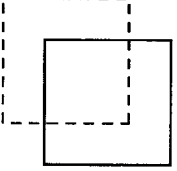
FIG15.D
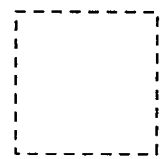
FIG16.A
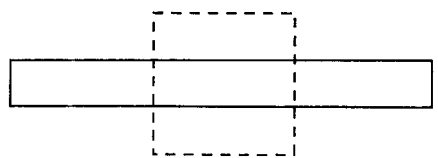
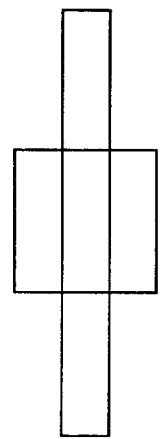
FIG16.B    FIG16.C

MOTION VECTOR ESTIMATION SYSTEM

BACKGROUND OF THE INVENTION

The present invention relates to a motion vector estimation system which is used for encoding a moving picture.

A motion compensated interframe prediction method using block matching, has been standardized and widely used as a technology of high-efficiently encoding moving picture data. However, since it is necessary to estimate a motion vector in order to realize an interframe prediction, a calculation became a vast amount to search a wide range. As a result, there are the problems that a system scale becomes larger, and that it is difficult to perform a real time processing.

There has been known a system disclosed in JP-A-1-166684/1989, which aims to improve an accuracy in motion estimation with a decrease of a calculation amount. The system can set an offset value at a center position of a search window for motion vector estimation corresponding to one. When the motion vector is detected at an end of the search window, an offset value of the next frame is set to a position of the end of the search window. By the shifting the search window in the manner, the search window of the motion vector is apparently expanded.

FIG. 13 is a block diagram showing a conventional motion vector estimation system. A frame memory 201 stores reference picture data. For a search of a motion vector, a difference calculating section 203 obtains a difference between an input current picture and a reference picture at a representative point which is set by a representative point setting section 202 for referring it corresponding to a search motion vector and offset values which are respectively set by a horizontal offset control section 206 and vertical offset control section 207. A frame difference adding section 204 calculates a total sum of differences between reference and current pictures, and a minimum value detecting section 205 estimates a motion vector which represents the minimum value of the total sum of differences between the pictures, then it outputs horizontal and vertical motion vector components. A final motion vector value is calculated by means of adders 210 and 211 which add offset values to the horizontal and vertical componet values, respectively, the offset values which are selected by selectors 208 and 209, respectively, according to offset designations which are respectively supplied from the horizontal and vertical offset control sections 206 and 207, which will set new offset values for searching the next motion vector according to the output of the minimum value detecting section 205.

Assuming that an offset value of the n-th frame is δV(n) under the observation of only one directional component, an offset setting method is set by the equation as follows:

$$\delta V(n+1) = \delta V(n) + \alpha \cdot \Delta V \quad \ldots (1).$$

When δV is a range of search window, a motion vector V is estimated in the range as follows:

$$-\Delta V \leq V \leq \Delta V \quad \ldots (2)$$

where a value of α is set as follows:

$\alpha = 1$ if $V = \Delta V$ $\alpha = -1$ if $V = -\Delta V \quad \ldots (3)$ $\alpha = 0$ else.

Further, there has been well known the method disclosed in JP-A-5-328333/1993 as the method different from the above-mentioned method. In this method, the search window is changed over at each block based on a result of the past motion vector.

FIG. 14 is a block diagram showing the conventional motion vector estimation system. A motion vector estimation circuit 301 estimates a motion vector whose a predictive error is the minimum value within the search window designated by a selector 304, based on input data of the current picture and reference picture data. The motion vector is outputted to a motion compensator which is not shown in the figure, and inputted to motion vectors memory 302.

The motion vector memory 302 stores a motion vector for one-frame term so as to output them to a search window decision circuit 303 as a motion vector of the block which has the same spatial position as that of the previous frame. The search window decision circuit 303 decides a search window of the motion vector in an objective block in the present frame corresponding to size and direction of the motion vector in the previous frame. The selector 304 selects and outputs one of search windows 305 to 307 corresponding to the decided result of the decision circuit 303. The motion vector estimation circuit 301 performs a motion vector estimation according to the selected search window.

A kind of the search windows includes a normal search window (FIG. 15A), a search window for attaching importance to the horizontal direction shown by a border of a solid line (FIG. 15B), a search window for attaching importance to the vertical direction shown by a border of a solid line (FIG. 15C), and a search window for attaching importance to the diagonal direction shown by a border of a solid line (FIG. 15D). Alternatively, it is possible to use search windows which have modified shapes to the normal search window (FIG. 16A), such as a search window for attaching importance to the horizontal direction shown by a border of a solid line (FIG. 16B), a search window for attaching importance to the vertical direction shown by a border of a solid line (FIG. 16C).

The first problem resides in that the optimum motion vector can not be estimated according to the method of shifting the search window only when the estimated motion vector is the specific value. It is impossible to estimate the optimum motion vector in the search window because the search window can not follow the motion vector in some occurrence of the motion vector.

The second problem resides in that the optimum motion vector can not be estimated according to the method of changing over the search windows corresponding to the size and direction of the estimated motion vector. Because this method can select the search windows only in the specific kinds.

The third problem resides in that the optimum motion vector can not be estimated according to the method of changing over the search window at each of blocks. Because it often happens to miss a prediction of the search window in a boundary section of the motion.

The fourth problem resides in that the optimum motion vector can not be estimated according to the method of using the motion vector as it is and which is estimated from the immediately before the coded picture. Because a scale of the motion vector does not coincide with each other in any kind of pictures according to a picture coding method in which a time interval between a reference picture and a coded picture changes.

SUMMARY OF THE INVENTION

The objective of the present invention is to solve the above-mentioned tasks.

Moreover, the objective of the invention is to provide the motion vector estimation system and method capable of estimating the optimum motion vector even in the case where a limited search window is used.

The objective of the present invention is achieved by the motion vector estimation system comprising a motion vector estimation means for estimating a motion vector having a minimum difference between reference picture data and current picture data after matching thereof in a predetermined search window of a motion vector in each of divided regions of which a picture is divided into a plurality of regions in a picture, motion vector statistics processing means for calculating a statistics value of detected motion vectors in each of the divided regions in the picture, shift vector setting means for calculating a shift vector in the search window of the motion vector in the picture to be next coded based on the statistics value of the motion vector calculated from a past coded picture in which the motion vector has been already estimated, and search window specification means for specifying motion vectors to be searched by the motion vector estimation means according to the calculated shift vector.

Furthermore, a motion vector estimating method according to the present invention, comprises steps of calculating a statistics value of a motion vector such as an average value and a histogram of each picture with respect to the motion vector which is estimated in the picture coded in past, setting a shift vector of the search window of the motion vector based on the statistics value, and regulating the shift vector corresponding to a time interval between reference picture and current picture.

According to the present invention, since the search window is controlled for each picture based on the statistics value of the motion vector at the picture, it is possible to predict a range in which the motion vector is estimated, thereby enabling the proper estimation of the motion vector. Further, since the estimated motion vector is directly used as the shift vector without a classification of such as a size, it is possible to set a shift of the search window with a merit of rapid following with the motion and a higher flexibility or adaptability.

Though, the motion vector statistics processing means in the present invention may calculate the average value or histogram as the statistics value.

Further, the shift vector setting means according to the present invention sets as the shift vector;

(1) the average value of the estimation vector, or (2) the motion vector representing the most frequent value from the histogram, or (3) the average value of the maximum value and minimum value for the horizontal and vertical components in the motion vector in the manner of in the manner of extracting the motion vector detected over a predetermined frequency from the histogram of the motion vector, or (4) the average value of extracted motion vectors in the manner of extracting the motion vector detected over a predetermined frequency from the histogram of the motion vector.

The motion vector statistics processing means according to the present invention individually calculates the statistics value of the motion vector of the forward prediction and backward prediction when both the motion vectors in the forward prediction and backward prediction are estimated.

The shift vector setting means according to the present invention individually sets the shift vector of the search window of the motion vector of the forward prediction and backward prediction when both the motion vectors in the forward prediction and backward prediction are estimated.

The shift vector setting means according to the present invention sets the shift vector of the search window corresponding to a proportion of the first and second time intervals, in which the first time interval is between the reference picture and the picture from which the motion vector is estimated, and the second time interval is between the reference picture and the picture to which the next shift vector is set.

The shift vector setting means according to the present invention may set the value of the time interval according to the average value of the time intervals in the case capable of using a plurality of reference pictures each having different time intervals, may set the value of the time interval according to a selection of one time interval in the case capable of using the plurality of the reference pictures, and may set the value of the time interval between the reference picture and the picture in which the motion vector of an average value is estimated, in which the average value is calculated corresponding to a ratio of which the reference picture is selected in the case capable of using the plurality of the reference pictures.

BRIEF DESCRIPTION OF THE DRAWINGS

This and other objects, features and advantages of the present invention will become more apparent upon a reading of the following detailed description and drawings, in which:

FIGS. 15A–D are views for explaining a search windows in the conventional motion vector estimation system; and FIGS. 16A–C are views for explaining a search windows in the conventional motion vector estimation system.

DESCRIPTION OF THE EMBODIMENTS

There will be described in detail an embodiment of the present invention with reference to the attached drawings.

Figure 1:
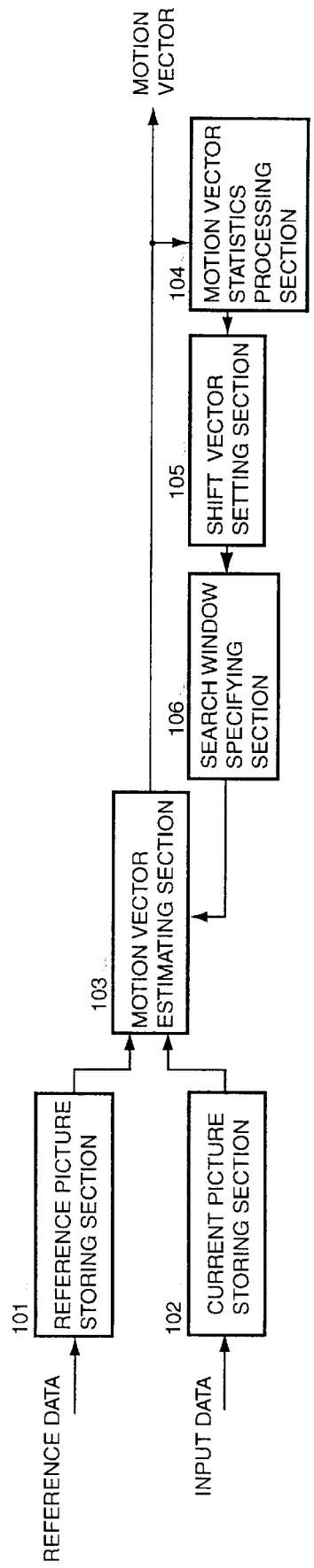
FIG. 1 is a block diagram showing the motion vector estimation system according to an embodiment of the present invention.

FIG. 1 is a block diagram showing a motion vector estimation system according to an embodiment of the present invention.

The motion vector estimation system according to this embodiment comprises, as shown in FIG. 1, a reference picture storing section 101, a current picture storing section 102, a motion vector estimating section 103, a motion vector statistics processing section 104, a shift vector setting section 105, and a search window specifying section 106.

Figures 2, 3, 4:
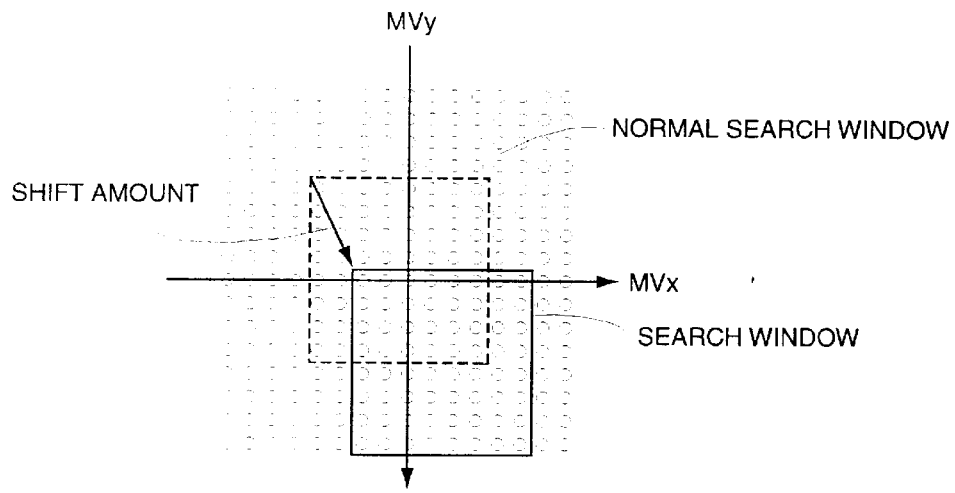
FIG. 2 is an explanatory view showing a shift of the motion vector search window.
FIG. 3 is an explanatory view showing a histogram of the motion vector.
FIG. 4 is an explanatory view showing a result of a threshold processing to the histogram of the motion vector.

FIG. 2 is a view for explaining a shift of a motion vector search window. Small circles in FIG. 2 correspond to search points. A normal search window in an example shown in FIG. 2, is encircled by a dotted line, and a motion vector search is performed in the normal search window of −4≦MVx≦+3 and −4≦MVy≦+3. Here, when (2,4) is specified as a shift vector, the motion vector estimation is performed in a window of −2≦MVx≦+5 and 0≦MVy≦+7, which is encircled by a solid line in FIG. 2. In this case, the search is mainly performed with the motion vector from lower right section. According to this, the search window is controlled by providing the shift vector.

(Calculation of statistics value)

Then, there will be described a calculation of a statistics value in the motion vector statistics processing section 104. In this paragraph, there is calculated the statistics such as an average value and histogram of the estimated motion vector. In the calculation of the average value, the motion vector values are accumulated at each input of the estimated motion vectors. When a processing on one picture is completed, the accumulation value is divided by a number of the estimated motion vector to obtain the average value of the motion vector. At this time, a rounding processing may be performed at the necessary accuracy.

In the calculation of the histogram, when each of estimated motion vector is supplied, an increment for a value of a frequency is performed corresponding to the vector. When processing of one picture is completed, a frequency of respective estimated motion vector is determined to obtain the histogram.

Even though it is necessary to provide a memory means capable of storing an amount of the detectable motion vector to store occurrence frequency data, the motion vector estimation system may count a frequency of quantized representative value after quantizing a value of the motion vector in order to reduce a memory area.

Here, in the case of estimating the motion vectors having different predicting direction such as the forward prediction and backward prediction, the motion vectors are calculated for each of predicting directions. Alternatively, the motion vector of one of the directions is changed in the opposite direction so as to be standardized with the time interval to the reference picture, so that it is possible to calculate as the motion vector having the same kind of the predicting direction.

Further, in the statistics calculation, in the case of estimating a plurality of motion vectors in the same predictive direction in one block, all of the estimated motion vectors are counted. For example, this case includes a case of a field prediction in a frame structure, a case of 16 by 8 (16×8) prediction in a field structure, or a case of a dual-prime prediction in the standard of MPEG-2 (ISO/IEC13818). At this time, a weight may be adjusted by a number of all of the estimated. For example, when two motion vectors are estimated from one block, a statistics is calculated with the weight of ½ to each of motion vectors. Alternatively, when a plurality of motion vectors is estimated in the same direction, only one motion vector may be an object of the statistics calculation for the sake of a simplification.

Moreover, there is a case where a motion vector is not estimated in processing of one block. Such the condition occurs in a case of selecting an intra-coding mode in which an intra-frame coding is performed and an interframe prediction is not performed, for example, in the MPEG-2. In this case, an accumulation and a frequency update of the motion vector is not performed in the statistics calculation. Alternatively, an object of the statistics calculation may be the value of the motion vector which is estimated as a motion vector of a non-intra-mode when judging an intra-/non-intra-mode.

(Setting a shift vector)

Next, there is described a method of setting a shift vector in the shift vector setting section 105. At first, there is described a case of calculating an average value per a picture of the motion vector as the motion vector statistics value. When the average value per the picture is calculated, the average value is set to the shift vector as it is. Though, when an average calculation is performed by a relative motion vector which does not include the shift vector, the average value is used after converting to a value including the shift vector.

Next, there is described a case of a calculation of a histogram per a picture of the estimated motion vector. The histogram represents a frequency of the motion vector which is estimated at the motion vector search point in the search window. One of methods of setting the shift vector from the histogram, is a method of selecting the motion vector having the highest frequency. Since the highest frequency is shown at the point of {(MVx', Mvy')=(−1, 0) as the example in FIG. 3, if (MVx', Mvy') is the relative motion vector which does not include the shift vector, the motion vector is used after adding the shift vector thereto. Further, when there are a plurality of motion vectors each having the highest frequency, a centroidal point thereof is set as the shift vector.

Alternatively, any one thereof is set as the shift vector to simplify processing, for example, from a motion vector which is initial or last one in a scanning order, or the nearest one of the position (0, 0).

There is a method of using the motion vectors each having a frequency more than a predetermined frequency as another method of setting the shift vector from the histogram. For example, the histogram is processed by a threshold value to be a binary value. FIG. 4 shows the histogram in FIG. 3 of motion vectors in which the histogram on or over two of the frequency is binarized in '1' and the histogram under two of the frequency is in '0'. After the binarization, an average value of the motion vector representing '1' is set as the shift vector. In an example shown in FIG. 4, for example, the shift mount is set to (−0.928, −0.357). Alternatively, the shift vector is set from an average value of the maximum value and the minimum value of each component of the motion vector representing '1'. In this method, since the maximum value of MVx' is 1, the minimum value of MVx' is −3, the maximum value of MVy' is 1, and the minimum value of Mvy' is −2 in the example shown in FIG. 4, (−1, −0.5) is the shift vector.

Even though there has been described the method of calculating the shift vector by binarizing the histogram in the above description, there may be a method of processing the motion vector estimation by using the histogram as the same condition as that shown in FIG. 3 in comparison with the threshold value of the frequency without the binarization of the histogram. Further, there may be a method of setting an upper limit value in a frequency record when the histogram is made, and making and using the maximum value of the histogram over the upper limit value.

Figure 5:
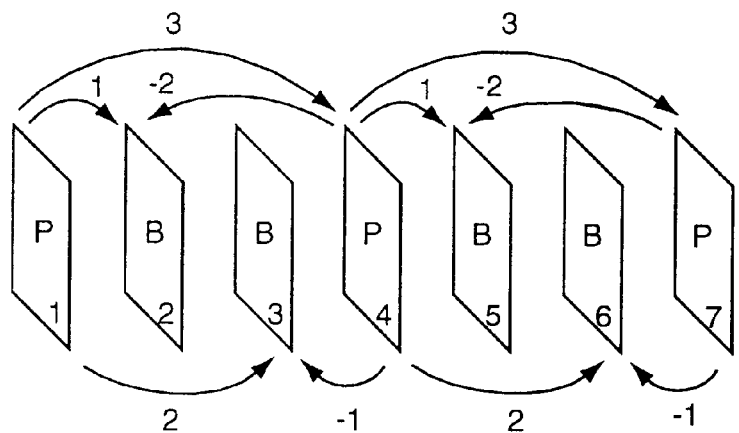
FIG. 5 is a view for explaining a time interval of the picture in which the motion vector is estimated.

Since there are a plurality of predictive directions, the statistics value is calculated about each of the predictive directions, and the above-mentioned shift vector is set about each of the predictive directions. For example, FIG. 5 is a perspective view showing a coding method using a picture (P-picture) which performs only a prediction in the forward direction, and a picture (B-picture) which can be predicted in the bidirection, namely, in the forward and backward directions. In the figure, with respect to a picture 2 being the B-picture, the forward directional prediction is performed by using a picture 1 being the P-picture as a reference picture, and the backward directional prediction is performed by using a picture 4 being the P-picture as the reference picture. At this time, both of the statistics value are calculated with respect to the motion vectors which are estimated for the forward and backward predictions, respectively. Further, the shift vectors of the search window are also set for the forward and backward directions, respectively, in order to estimate the motion vector. Here, in order to determine the search window shift vector in the backward prediction from only an estimated result of the forward prediction, a sign of the shift vector in the forward prediction is reversed.

(A adjustment of the shift vector)

Next, when a time interval between a reference picture and the current picture changes in every picture, there is described a method of regulating the shift vector corresponding to the time interval. At first, the description is performed by using an example shown in FIG. 5. In this example, a P-picture is coded at every three pictures, and a B-picture is coded with respect to two pictures between the P-pictures. It is assumed that a coding of a picture 1 is now completed, and the coding process is then performed in the order of picture 4, picture 2, picture 3, picture 7, . . . , and so on. In this case, assuming that an interval between succeeding two pictures is 1, a motion vector of a P-picture on the picture 4 (P4) is the motion vector corresponding to 3 of the time interval. Further, on a B-picture of the picture 2 (B2) which is next coded, the motion vector in the forward direction has the time interval to be 1, and the motion vector in the backward direction has the time interval to be 2. At this time, the shift vector for the prediction in the forward direction of B2 may be ⅓ of the shift vector obtained at P4, and the shift vector for the prediction in the backward direction of B2 may be −⅔ of the shift vector obtained at P4. In the same manner, the shift vector for the forward prediction of B-picture on the picture 3 (B3) may be two times of the shift vector for the forward prediction obtained at B2, and the shift vector for the backward prediction may be ½ of the shift vector for the backward prediction obtained at B2. Further, the shift vector for the forward prediction of the P-picture on picture 7 (P7) may be 3⁄2 times of the shift vector for the forward prediction obtained at B3.

Figure 6:
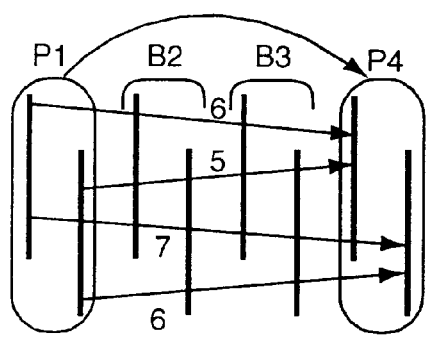
FIG. 6 is a view for explaining a time interval of a picture In case of a field prediction.
Figure 7:
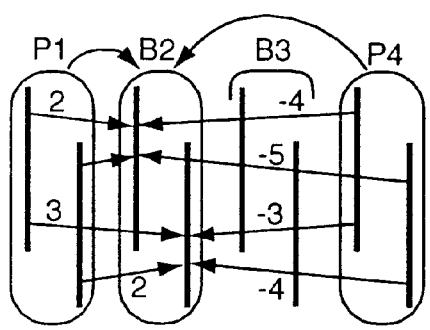
FIG. 7 is a view for explaining a time interval of a picture in case of a field prediction.
Figure 8:
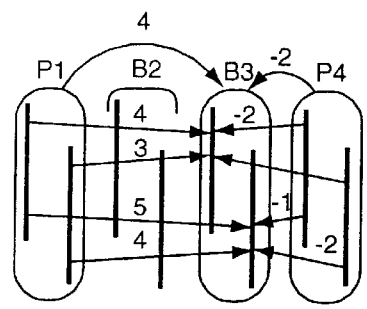
FIG. 8 is a view for explaining a time interval of a picture in case of a field prediction.

Moreover, it is possible to use a prediction of a unit of a field in the case of processing an interlaced signal such as MPEG-2. In this case, it is sufficient to adjust the picture interval of the field. For example, when the interval of the P-picture is three frames as shown in FIG. 6, it is supposed that the motion vector is estimated from a P-picture of picture 4 (P4) in the frame structure. Here, one frame is constituted from 2 fields, and two fields of P4 can refer two fields of a P-picture of the picture 1 (P1). Therefore, when the field prediction is selected, the first field of P4 has the time interval 5 and 6 by the referred field, and the second field has the time interval 6 and 7. When the frame prediction is selected, the time interval is 6 by counting as the field interval. Further, a condition of the B-picture is he same as above, as shown in FIGS. 7 and 8. For example, the forward prediction of the B-picture of picture 2 has respective fields each having the time interval to be 1 and 2 after referring the field of P1.

Figure 9:
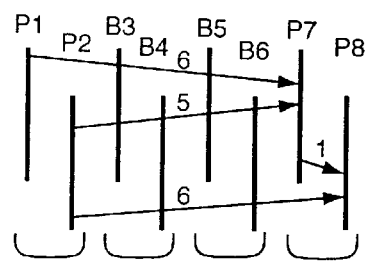
FIG. 9 is a view for explaining a time interval of a picture in case of a field prediction.

Further, when a coding is performed by a field structure, the P-picture has a reference relation shown in FIG. 9. That is, a picture P7 refers to a picture P1 or a picture P2. In the same manner, a picture P8 refers to the picture P2 or the picture P7. Accordingly, the picture P7 has 5 and 6 of the time intervals, and the picture P8 has 1 and 6 of the time intervals. The reference relation of the B-picture in the field structure is the same as that in the case of coding in the frame structure, as has been already shown in FIGS. 7 and 8.

Figure 10:
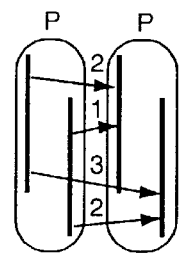
FIG. 10 a view for explaining a time interval of a picture in case of a dual-prime prediction.
Figure 11:
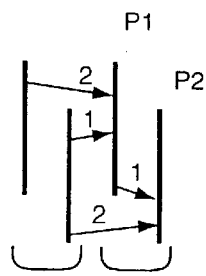
FIG. 11 is a view for explaining a time interval of a picture in case of a dual-prime prediction.

Moreover, when the B-picture is not used in MPEG-2, it is possible to apply a dual prime prediction for performing an average prediction between common and opposite parities of fields. In this case, the frame structure has 1 and 2, or 2 and 3, of the time intervals as shown in FIG. 10, and the field structure has 1 and 2 of the time intervals as shown in FIG. 11.

As has been described above, also when the field prediction is used, the prediction uses the time intervals which are set as above, calculates a proportion between the time interval corresponding to the estimated motion vector and the time interval corresponding to the picture to which the shift vector is set, and adjusts the shift vector according to the proportion. However, since it is possible to use a plurality of reference fields each having the different time intervals, the statistics are calculated under the consideration of the proportion of the selected reference fields. Here, the referred field proportion can not be previously obtained in the picture from which the motion vector will be estimated. Therefore, an average value is set about a plurality of time intervals. For example, even though the first field of B2 shown in FIG. 7 has 1 and 2 of the time intervals corresponding to the motion vector in the forward direction, the average value 3⁄2 thereof is supposed to be the time interval. Alternatively, for the sake of the simplification, there may be provided the method of selecting any of thereof, for example, always using the shorter time interval, always using the time interval of the same parity field, and the like. In the same manner, when the statistics are calculated, it is possible to calculate without using the selected field data for the sake of the simplification. Also in this case, the time interval may be selected from the average value of the enabling values or one value in the candidates. For example, there is considered the case of the picture P8 which will be coded after the picture P7 as shown in FIG. 9. When the time interval is taken from an average value of a plurality of reference pictures, the shift vector is (1+6)/(6+5) times of the shift vector which can be obtained from the motion vector statistics of P7. In the same manner, it is possible to calculate with respect to other pictures.

As mentioned above, even though there has been described the structure of the time interval for coding the P-picture about every three frames, it is possible to obtain the same effect in the case of coding by the different structure. Furthermore, in the case of the frame skip structure in which the time interval from the reference picture changes, it can be considered in the same manner. Moreover, even though there is a case in which the picture of an intraframe coding without performing the motion vector estimation, it may be considered with exclusion such the picture.

Further, in order to eliminate a adjustment based on a time interval, a shift vector before a time adjustment may be applied to the picture having the same positional relation after having been stored during several frames. For example, in FIG. 5, the shift vector calculated as the result of processing P4 is not applied to B2 and B3, and may apply to P7 as it is, after storing during several frames.

In the same manner, the shift vector calculated as the result of processing B2 may be applied to B5, and the shift vector calculated as the result of processing B3 may be applied to B6.

Furthermore, the shift vector is set not only from the picture coded immediately before setting and data of one picture before several pictures, but also using data of a plurality of pictures which have been previously coded. For example, there may be used a method of setting as new shift vector an average value of the shift vectors immediately before past n frame/frames (n denotes a positive and integral number) and the like.

At last, the shift value is modified within a range capable of actually setting. For example, if each of components of the shift vector is over the maximum value and the minimum value which can be set, the shift vector is attached to the maximum value or the minimum value. Further, the shift vector is rounded to the minimum unit such as the pixel unit to which the shift vector can be set.

As described above, the system according to this embodiment shifts the position of the search window without changing the size of the window. Since the shift vector is set corresponding to the statistics value of the motion vector which is estimated in the past coded picture/pictures, it is possible to properly predict a window from which the motion vector is estimated, and to estimate the proper motion vector even in the case of using the limited search window. Actually, as the result of applying the search window shifting method of the present embodiment to the picture coding method of MPEG-2 (ISO/IEC-13813), it is possible to improve a noise to signal (S-N) ratio (S/N) with respect to the picture including a motion which can not be estimated in the normal search window in comparison with the case where the search window is not shifted.

Figure 12:
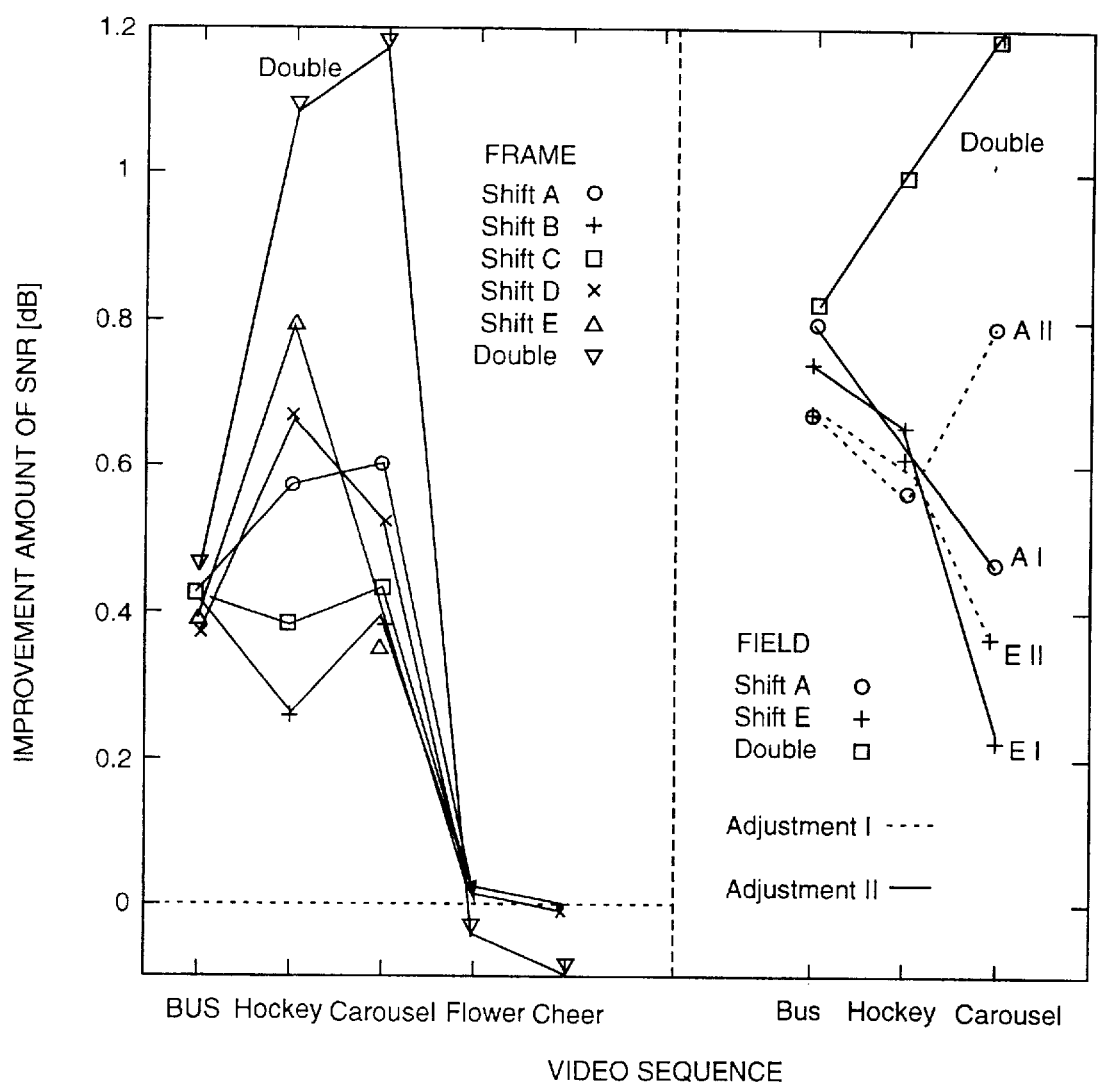
FIG. 12 is a view for explaining an effect of shifting a search window.
Figure 13:
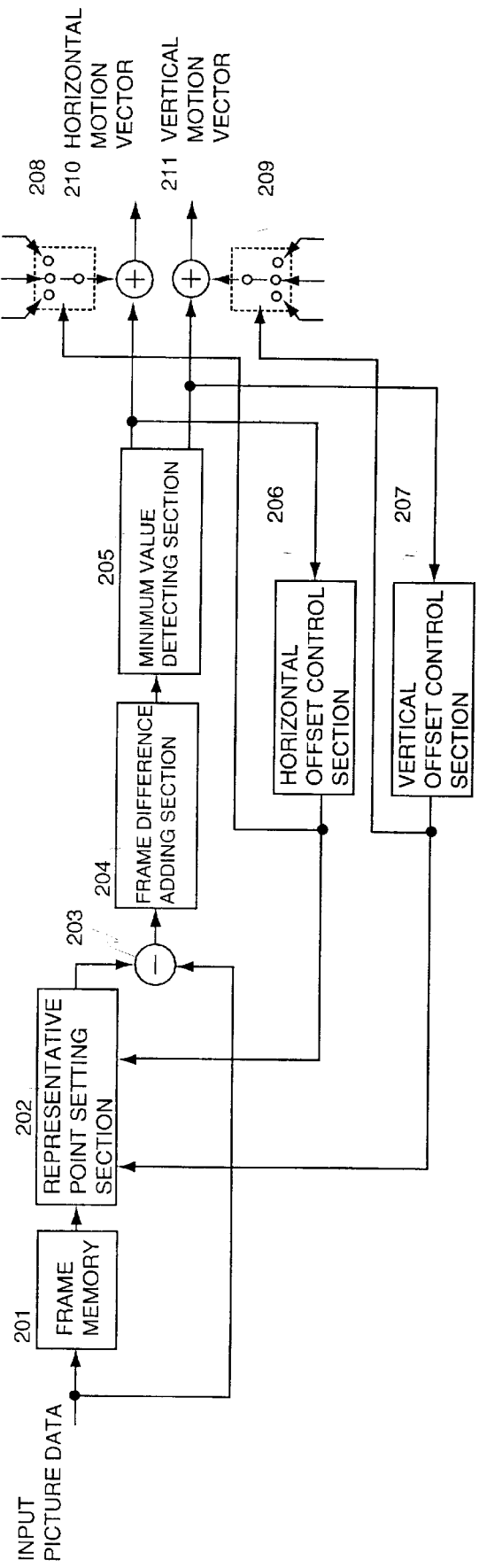
FIG. 13 is a block diagram showing the conventional motion vector estimation system.
Figure 14:
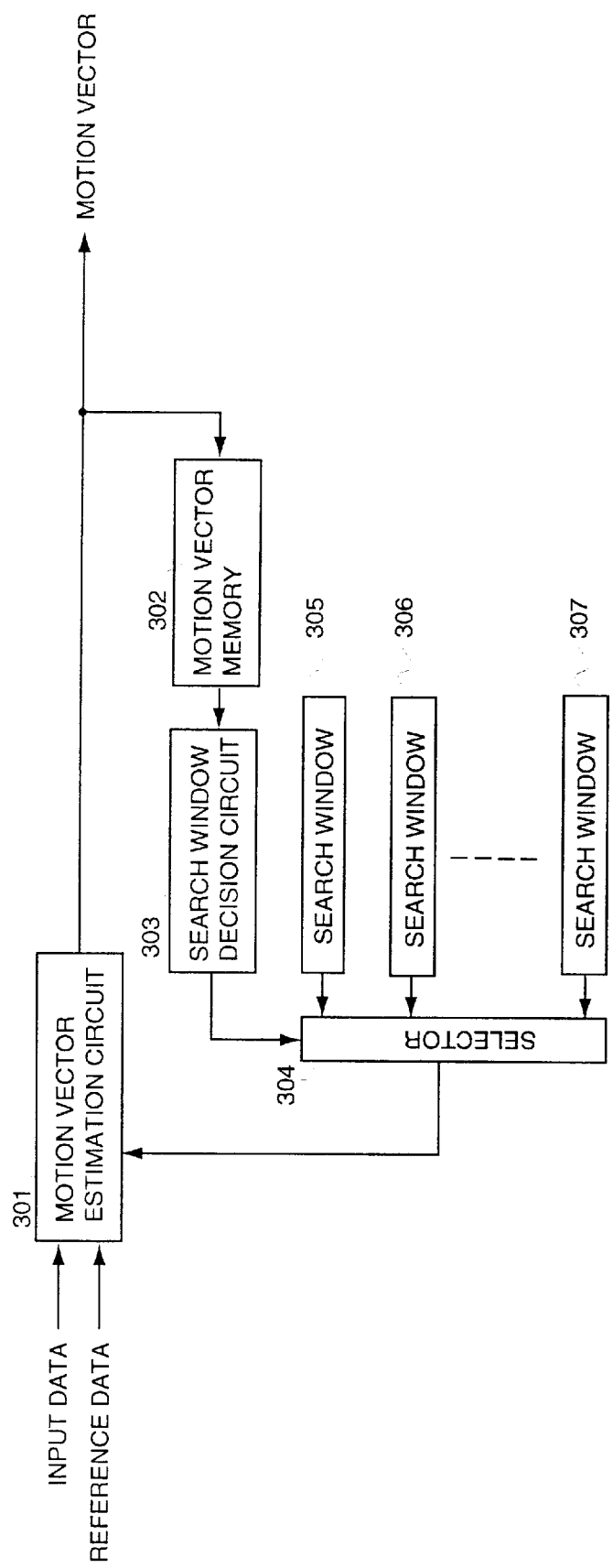
FIG. 14 is a block diagram showing the conventional motion vector estimation system.

FIG. 12 shows a result of the actual simulation. The figure is a graph showing an improved amount of the S-N ratio in the case where the motion vector search window is shifted when the moving picture is coded to several kinds of pictures, in comparison with the fixed search window of the motion vector. The left side of the graph shows a case of coding by the frame structure, and the right side of the graph shows a case of coding by the field structure, respectively. There are conditions of the simulation in which the normal search window has the maximum range of −47 through +47 pixels in the horizontal direction and −15 through +15 pixels in the vertical direction, and a bit rate is 4 Mbit/second.

In the case of coding by the frame structure, a method of a shift A is the method in which the shift vector of the succeeding coded picture is to be an average value of the motion vector picture estimated from the previously coded picture. A method of a shift B is the method in which the shift vector is to be the average value of the average value of the estimated motion vectors in an entire pictures coded in past. A method of a shift C is the method in which the shift vector of the succeeding picture is to be the average value of the average value of the estimated motion vectors in further four past pictures. A method of a shift D is the method in which the shift vector of the succeeding picture is to a center point of the outermost motion vectors after observing the histograms of the motion vector estimated from the previously coded pictures and extracting the detected motion vectors having a frequency over 15. That is, this method uses average values of maximum and minimum values of the horizontal and vertical direction components of the extracted motion vectors, respectively. A method of a shift E is the method in which the shift vector of the succeeding coded picture is to be the average value of the motion vectors having a frequency over 15 after observing the histogram of the motion vector estimated from the picture previously coded. In any of methods described above, there is an improved effect of the picture quality measured by the S-N ratio with respect to the picture having a rapid moving such as "Bus", "Hockey", and "Carousel". Though, the method of Double is that in which the search window is two time of the normal one, and the search window is not shifted, which has a higher performance but the calculation amount becomes four times of the other methods.

In the case of coding by the field structure, there is shown in FIG. 12 a result of which two time adjustment methods apply to the methods of shift A and shift B. At first, the method of Adjustment I is a method of regulating the time interval as the same as that of the frame structure. Accordingly, this method is that all of the time interval with the reference picture is supposed to be a distance of the same parity field. On the other hand, the method of Adjustment II is a method of regulating the time intervals of a plurality of reference frames corresponding to the estimated motion vector by using a ratio which has been estimated. As a result, as has been understood from the graph, it is possible to improve the picture quality measured by the S-N ratio in all of the above-mentioned methods.

As shown in the result of the simulation, even though the picture has a rapid moving which can not be covered by the normal search window, the motion vector can be estimated by shifting the search window so as to estimate the optimum motion vector, thereby obtaining an improved effect of the picture quality in the case of coding under the fixed rate.

The entire disclosure of Japanese Patent application Ser. No. 9-138598 filed on May 28, 1997, including specification, claims, drawing and summary are incorporated herein by reference in its entirety.

What is claimed is:

1. A motion vector estimation system, comprising:
   motion vector estimation means for estimating a motion vector having a minimum difference between reference picture data and current picture data after matching thereof in a predetermined search window of a motion vector in each of divided regions of which a picture is divided into a plurality of regions in a picture;
   motion vector statistics processing means for calculating a statistics value of detected motion vectors in each of the divided regions in the picture;
   shift vector setting means for calculating a shift vector in the search window of the motion vector in the picture to be next coded based on the statistics value of the motion vector calculated from a past coded picture in which the motion vector has been already estimated; and
   search window specify means for specification a proposed motion vector to be estimated by the motion vector estimation means according to the calculated shift vector.

2. The motion vector estimation system of claim 1, wherein said motion vector statistics processing means comprises means for calculating an average value of said motion vectors as said statistics of said motion vectors.

3. The motion vector estimation system of claim 2, wherein said means for calculating said average value of motion vector further comprises, in a case of estimating a plurality of motion vectors each having a predictive direction in a divided region, means for adjusting a weight to said estimated motion vector.

4. The motion vector estimation system of claim 2, wherein said shift vector setting means comprises means for setting said average value of said motion vectors as said shift vector.

5. The motion vector estimation system of claim 1, wherein said motion vector statistics processing means comprises means for calculating a histogram of said motion vectors as said statistics of said motion vectors.

6. The motion vector estimation system of claim 5, wherein said means for calculating said histogram further comprises, in a case of estimating a plurality of motion vectors each having a predictive direction in a divided region, means for adjusting a weight to said estimated motion vector.

7. The motion vector estimation system of claim 5, wherein said shift vector setting means comprises means for setting as said shift vector a motion vector having the most frequent value of said histogram of said motion vectors.

8. The motion vector estimation system of claim 5, wherein said shift vector setting means comprises means for extracting motion vectors detected more than a predetermined frequency from said histogram of said motion vectors, and for setting said average value of said extracted motion vector as said shift vector.

9. The motion vector estimation system of claim 5, wherein said shift vector setting means comprises means for extracting motion vectors detected more than a predetermined frequency from said histogram of said motion vectors, and for setting said average value of maximum values and minimum values in a horizontal and vertical directional components of said extracted motion vector as said shift vector.

10. The motion vector estimation system of claim 1, wherein said motion vector statistics processing means comprises, in a case of estimating motion vectors each having different predictive directions, means for individually calculating a statistics value of motion vectors in particular predictive directions in said different predictive directions.

11. The motion vector estimation system of claim 1, wherein said shift vector setting means comprises, in a case of estimating motion vectors in a forward prediction and motion vectors in a backward prediction, means for individually setting shift vectors in each direction of said forward and backward predictions.

12. The motion vector estimation system of claim 1, wherein said shift vector setting means comprises means for setting said shift vector of a search window corresponding to a proportion of a time interval between a reference picture and a picture in which a motion vector is estimated, and a time interval between a reference picture and a picture in which a next shift vector will be set.

13. The motion vector estimation system of claim 1, wherein said shift vector setting means comprises, in a case of using a plurality of reference pictures each having different time intervals, means for setting a shift vector of a search window by using an average value of said time intervals to be said time interval.

14. The motion vector estimation system of claim 1, wherein said shift vector setting means comprises, in a case of using a plurality of reference pictures each having different time intervals, means for setting a shift vector of a search window by selecting one of said plurality of time interval to be a value of said time interval.

15. The motion vector estimation system of claim 1, wherein said shift vector setting means, in a case of using a plurality of reference pictures each having different time intervals, means for setting a shift vector of a search window, after calculating an average value of said time intervals corresponding to a rate in which each of said reference pictures is selected to set said average value as the time interval between the reference picture and a picture in which a motion vector having said average value.

16. A motion vector estimation method applied to moving picture coding, comprising:

a step of calculating a statistics value of motion vectors of each of pictures with respect to said motion vectors estimated from pictures which are previously coded;

a step of calculating a shift vector of a search window of a motion vector on a picture which will be coded, based on said statistics value which is calculated in the previous step, and a step of designating a search window of said motion vector, based on said shift vector calculated in said step.

17. The motion vector estimation method of claim 16, wherein said step of calculating said statistics of the motion vector, includes a step of calculating an average value of said motion vectors as said statistics of said motion vectors.

18. The motion vector estimation method of claim 17, wherein said step of calculating said average value further comprises, in a case of estimating a plurality of motion vectors each having a predictive direction in a same divided region, a step of adjusting a weight to said estimated motion vector.

19. The motion vector estimation method of claim 18, wherein said step of calculating said shift vector in said search window comprises a step of setting said average value of said motion vectors as said shift vector.

20. The motion vector estimation method of claim 16, wherein said step of calculating said statistics value of said motion vector, comprises a step of calculating a histogram of said motion vectors as said statistics of said motion vectors.

21. The motion vector estimation method of claim 20, wherein said step of calculating said histogram further comprises, in a case of estimating a plurality of motion vectors each having a predictive direction in a same divided region, a step of adjusting a weight to said estimated motion vector.

22. The motion vector estimation method of claim 20, wherein said step of calculating said shift vector in said search window comprises a step of setting as said shift vector a motion vector having the most frequent value of said histogram of said motion vectors.

23. The motion vector estimation method of claim 20, wherein said step of calculating said shift vector in said search window comprises a step of extracting motion vectors detected more than a predetermined frequency from said histogram of said motion vectors, and a step of setting said average value of said motion vector as said shift vector.

24. The motion vector estimation method of claim 20, wherein said step of calculating said shift vector in said search window comprises a step of extracting motion vectors detected more than a predetermined frequency from said histogram of said motion vectors, and a step of setting said average value of maximum values and minimum values in a horizontal and vertical directional components of said motion vector as said shift vector.

25. The motion vector estimation method of claim 16, wherein said step of calculating said statistics in said search window comprises, in a case of estimating motion vectors each having different predictive directions, a step of individually calculating a statistics value of motion vectors in particular predictive directions in said different predictive directions.

26. The motion vector estimation method of claim 16, wherein said step of calculating said shift vector in said search window comprises, in a case of estimating motion vectors in a forward prediction and motion vectors in a backward prediction, a step of individually setting shift vectors in each direction of said forward and backward predictions.

27. The motion vector estimation method of claim 16, wherein said step of calculating said shift vector in said search window comprises a step of setting said shift vector of a search window corresponding to a proportion of a time interval between a reference picture and a picture in which a motion vector is estimated, and a time interval between a reference picture and a picture in which a next shift vector will be set.

28. The motion vector estimation method of claim 16, wherein said step of calculating said shift vector in said search window comprises, in a case of using a plurality of reference pictures each having different time intervals, a step of setting a shift vector of a search window by using an average value of said time intervals to be said time interval.

29. The motion vector estimation method of claim 16, wherein said step of calculating said shift vector in said search window comprises, in a case of using a plurality of reference pictures each having different time intervals, a step of setting a shift vector of a search window by selecting one of said plurality of time interval to be a value of said time interval.

30. The motion vector estimation method of claim 16, wherein said step of calculating shift vector in said search window further comprises, in a case of using a plurality of reference pictures each having different time intervals, a step of calculating an average value of said time intervals corresponding to a rate in which each of said reference pictures is selected, a step of setting said average value as the time interval between the reference picture and a picture in which a motion vector having said average value, and a step of setting a shift vector of a search window.

* * * * *